United States Patent [19]

Mohr et al.

[11] Patent Number: 5,076,538
[45] Date of Patent: Dec. 31, 1991

[54] ELECTROMAGNETICALLY OPERATED VALVE, ESPECIALLY FOR ANTI-LOCK SYSTEMS IN MOTOR VEHICLES

[75] Inventors: Kurt Mohr, Halsenbach-Ehr; Gerhard Hahn, Stromberg, both of Fed. Rep. of Germany

[73] Assignee: Lucas Industries public limited company, Birmingham, England

[21] Appl. No.: 584,698

[22] Filed: Sep. 19, 1990

[30] Foreign Application Priority Data

Oct. 18, 1989 [DE] Fed. Rep. of Germany ....... 3934771

[51] Int. Cl.[5] .............................................. F16K 31/06
[52] U.S. Cl. .......................... 251/129.18; 251/129.02; 303/119 SV
[58] Field of Search ...................... 251/129.02, 129.18; 303/119

[56] References Cited

U.S. PATENT DOCUMENTS 4,620,565 11/1986 Brown ............................. 303/119 X
4,844,119 7/1989 Martinic .......................... 303/119 X

FOREIGN PATENT DOCUMENTS 1250223 9/1967 Fed. Rep. of Germany .
1911827 9/1970 Fed. Rep. of Germany .
3725810 2/1989 Fed. Rep. of Germany .
3802648 8/1989 Fed. Rep. of Germany .

Primary Examiner—Gerald A. Michalsky
Attorney, Agent, or Firm—Oblon, Spivak, McClelland, Maier & Neustadt

[57] ABSTRACT

The valve casing (12) houses an adjustment member (50) which is movable, in response to a pressure difference between the inlet (14) and the outlet (16) of the valve (10), from an inoperative position into a stop position in which the adjustment member (50) prevents the full opening of the valve. In this manner, when opening the valve (10), throttling which can be predetermined at random as compared to the fully open state takes place during a period of time while there still is a pressure difference between the inlet (14) and the outlet (16).

5 Claims, 5 Drawing Sheets

ELECTROMAGNETICALLY OPERATED VALVE, ESPECIALLY FOR ANTI-LOCK SYSTEMS IN MOTOR VEHICLES

FIELD OF INVENTION

The invention relates to an electromagnetically operated valve, especially for anti-lock systems in motor vehicles, comprising.

a valve casing which has an inlet and an outlet, two valve portions one of which includes a valve closing member and the other one a valve seat, and an electromagnet and a return spring by means of the two of which one of the two valve portions is movable back and forth with respect to the other one between an open position and a closing position.

DESCRIPTION OF THE PRIOR ART

With a known valve of this kind (DE 38 02 648 A1) one of the two valve portions with the valve closing member is pressed firmly into the valve casing and formed with a rod-like extension. The other valve portion which is sleeve-like is guided for displacement on this extension, and this valve portion is formed with the valve seat. The sleeve-like valve portion constitutes the armature of the electromagnet and is biased by a return spring, either in opening direction or in closing direction, depending on whether the valve is designed for the function "currentless open" or "currentless closed". The rod-like extension of the valve closing member extends all the way through the sleeve-like valve portion and practically has the same diameter as the valve seat. For this reason no hydraulic forces must be overcome on actuating the valve. Therefore, short switching times in the range of milliseconds can be observed with this known valve. The valve portion which is formed with the valve closing member has an axial bore which determines the flow cross section when the valve is open.

A compromise must be found between conflicting requirements when dimensioning the flow cross section of valves of the kind in question. It is desirable, in general, to have the greatest possible flow cross section. That is true particularly when such valves are used in anti-lock systems for motor vehicles where the desired short response time of the brakes during normal operation of the brakes can be observed only if the flow of the brake fluid from the master cylinder to the wheel brake cylinders does not encounter serious throttling anywhere. On the other hand, certain throttling of the flow in the valve is desirable when the valve is being opened after having been closed because of the risk of locking of the associated wheel. In this event unrestricted pressure in the valve might contribute to a renewed risk of locking. Thus it is customary to equip known valves of the kind defined initially with a rather narrow, firmly installed throttle in order to obtain sufficient flow restriction in this operating condition. That means having to put up with a somewhat delayed response of the brakes during normal operation.

It is also known (DE 37 25 810 A1) in the case of a magnetic valve for an anti-lock system to design a flow-in range, a sealing element in the form of a sealing sphere, and a sealing element carrier in the form of an apertured disc such that the flowing brake fluid will cause a suction effect within certain areas of stroke and flow. A retaining element in the form of a permanent magnet or a snap-action spring acting on the armature of the electromagnet is arranged so as to be overcome by the movement of the armature when the magnetic valve is controlled electrically. This is intended to provide a large flow cross section for normal brake actuation and a reduced flow cross section for anti-lock operation. Yet the suction effect which is due to the so-called hydrodynamic paradox occurs in a strictly limited range of stroke only. Therefore, it is hardly possible to design the valve in such a way as to obtain optimum and stable flow conditions both for normal circumstances, especially normal braking, on the one hand, and for control, especially anti-lock operation, on the other hand.

SUMMARY OF THE INVENTION

It is, therefore, an object of the invention to devise an electromagnetically operated valve, especially for anti-lock systems in motor vehicles, such that throttling which can be predetermined at random as compared to the fully open state takes place during a period of time while there still is a pressure difference between the inlet and the outlet.

That object is met, in accordance with the invention, with a valve of the kind specified initially, in that an adjustment member is disposed in the valve casing which member is movable, in response to a pressure difference between the inlet and the outlet, from an inoperative position into a stop position in which it prevents the full opening of the valve.

When a valve of the kind recited initially has been closed, for instance, in an anti-lock control operation quite a considerable pressure gradient may build up in very little time between the inlet and the outlet. This pressure gradient which may cause an undesirable quick pressure rise at the outlet and in any downstream units upon subsequent opening of known valves of the kind in question is utilized, in the case of the valve according to the invention, for moving the adjustment member into a predetermined stop position in which it will prevent the full opening of the valve until the pressure difference between inlet and outlet has been reduced to a predetermined residual value or is even eliminated altogether. As long as the adjustment member prevents the full opening of the valve, the flow of fluid controlled by the valve between the valve closing member and the valve seat is throttled to an extent which depends on how the stop position of the adjustment member was predetermined. This stop position, for example, may be determined once and for all by the dimensioning of the adjustment member and certain parts of the valve casing. In principle, however, it is also possible to set the stop position by a screw or the like so that it is variable, as required.

The adjustment member according to the invention, for instance, may be movable in the manner of a latch transversely of the travelling path of the electromagnetically operable valve portion so as to interrupt the opening movement thereof at a given place, thereby making sure that the flow through the valve is throttled until the pressure difference between the inlet and outlet thereof has been diminished as desired. The adjustment member also may be disposed paraxially with the valve portion whose stroke or lift it is meant to influence. Preferably however, the adjustment member is disposed coaxially with the two valve portions. That makes it easier to finish the valve casing, especially on a lathe.

In one embodiment of the invention the inlet is located, as usual, at one end of the valve casing and the adjustment member defines a control chamber which is located at the other end of the valve casing.

This embodiment may be developed further in that one of the valve portions with the valve closing member is stationarily arranged in the valve casing and includes a rod-like extension, the other valve portion which is sleeve-like is guided for displacement on the extension and formed with the valve seat, and the inlet communicates with the control chamber through an axial passage which extends through the valve closing member including the extension and through the adjustment member.

Of the three modifying features described above, the first and second one are known from DE 38 02 648 A1.

In another embodiment of the invention both valve portions are movable with respect to the valve casing, and one of them is controlled electromagnetically, while the other one is controlled by the adjustment member. Conveniently, this embodiment is developed further in that the second valve portion forms a unit with the adjustment member.

With all the embodiments described, the adjustment member may be biased in the direction toward its position of rest by a spring which is supported in the valve casing. However, the measures may be also be different to make sure that the adjustment member will adopt its inoperative position when the pressure is balanced between the inlet and outlet of the valve according to the invention. For example, the adjustment member may be a differential piston or a stepped piston or a diaphragm.

The invention is equally applicable to normally closed valves as to valves which normally are open.

BRIEF DESCRIPTION OF THE DRAWINGS

Embodiments of the invention will be described in greater detail below with reference to the accompanying drawings, in which.

DESCRIPTION OF THE PREFERRED EMBODIMENTS

Figure 1:
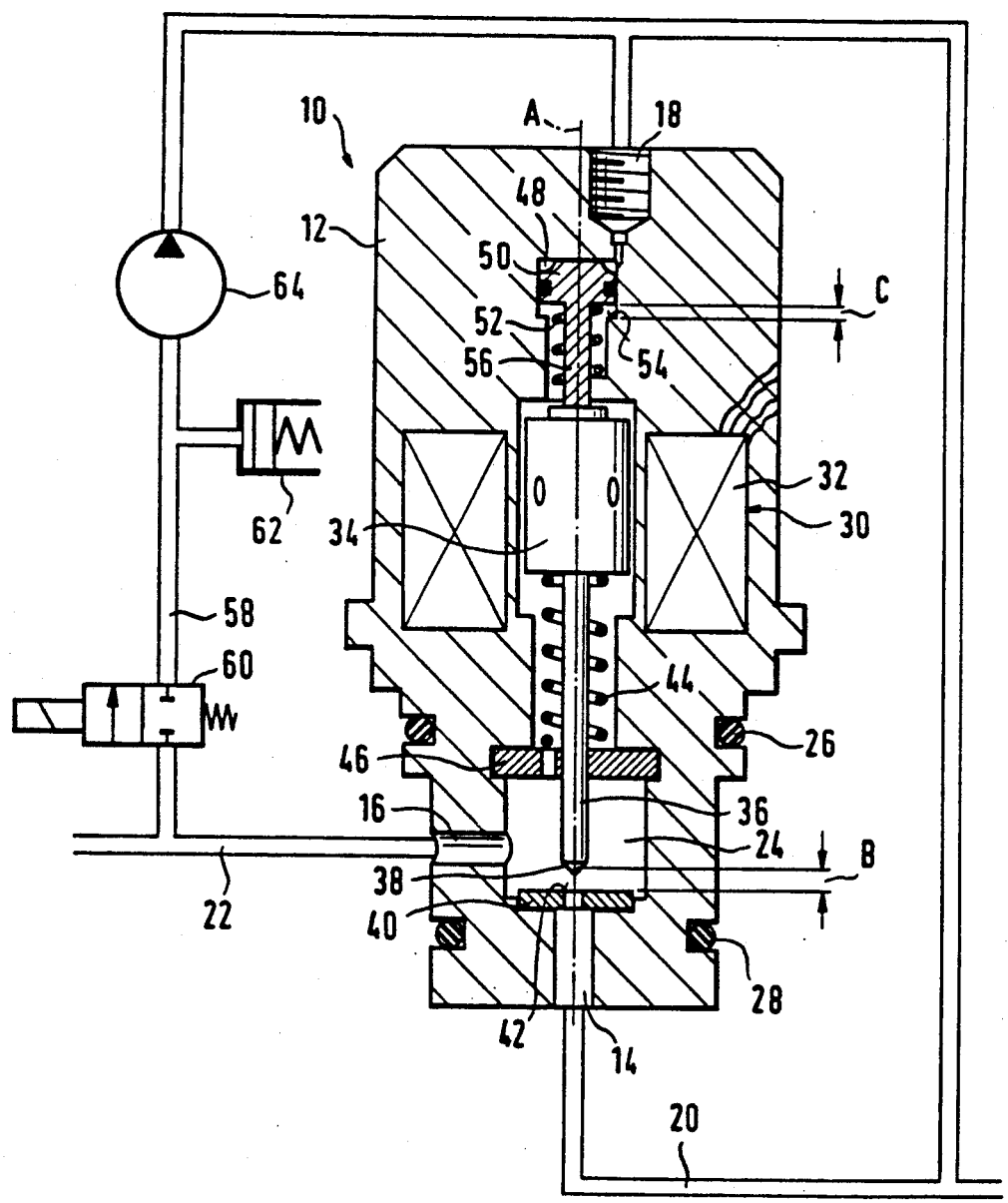
FIG. 1 is a vertical cross sectional view of a valve according to the invention.

Each of the valves 10 shown in FIGS. 1 to 5 comprises a valve casing 12 with an inlet 14 and an outlet 16. The valve shown in FIG. 1 has an additional connection 18 adapted to be connected just like the inlet 14 through a conduit 20 to the master cylinder (not shown). The outlet 16 can be connected through a conduit 22 to a wheel brake cylinder (likewise not shown). Corresponding connections are provided for the inlet 14 and outlet 16 of the valves illustrated in FIGS. 2 to 5 as well without being shown once more.

Each of the five valves comprises a valve chamber 24 which is enclosed by the valve casing 12 and in which prevails at least approximately the same pressure as at the outlet 16. The valve casing 12 of each of the valves shown has a socket-like lower section enclosed by two sealing rings 26 and 28 and adapted to be inserted in a housing (not shown) of a conventional brake pressure modulator.

Each of the valves 10 shown comprises an electromagnet 30 including a coil 32 which is arranged either inside or around the valve casing 12 and an armature 34 which is guided for movement inside the valve casing 12 along the main axis A thereof. In the case of the valves according to FIGS. 1,2,4, and 5 the armature 34 serves to actuate a valve portion 36 which comprises a conical valve closing member 38 and cooperates with a valve portion 40 formed with an annular valve seat 42. In the case of the embodiment according to FIG. 3, on the other hand, the armature 34 actuates the valve member 40 which in this case is sleeve-like and has the annular seat 42, while the valve portion 36 including the valve closing member 38 is stationary with respect to the valve casing 12.

Figure 2:
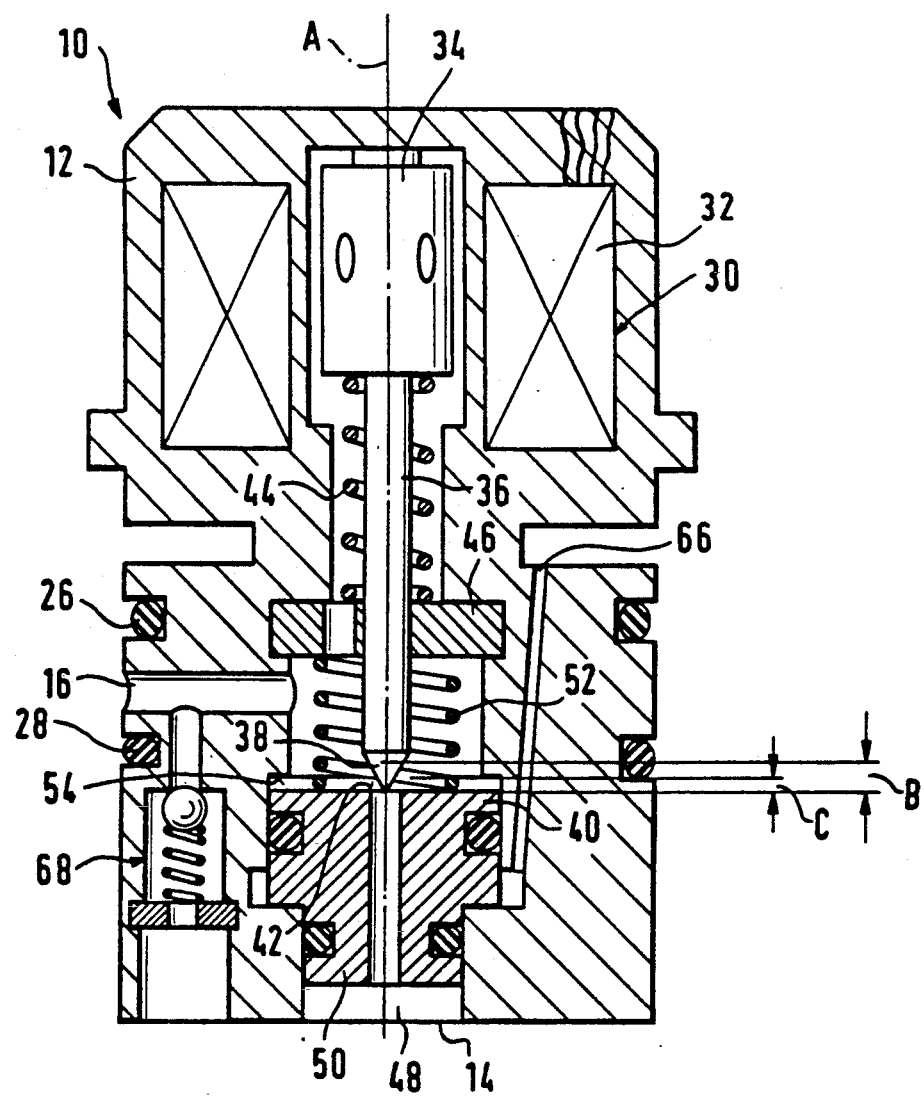
FIG. 2 is a view similar to FIG. 1 but showing a second embodiment of the invention.
Figure 3:
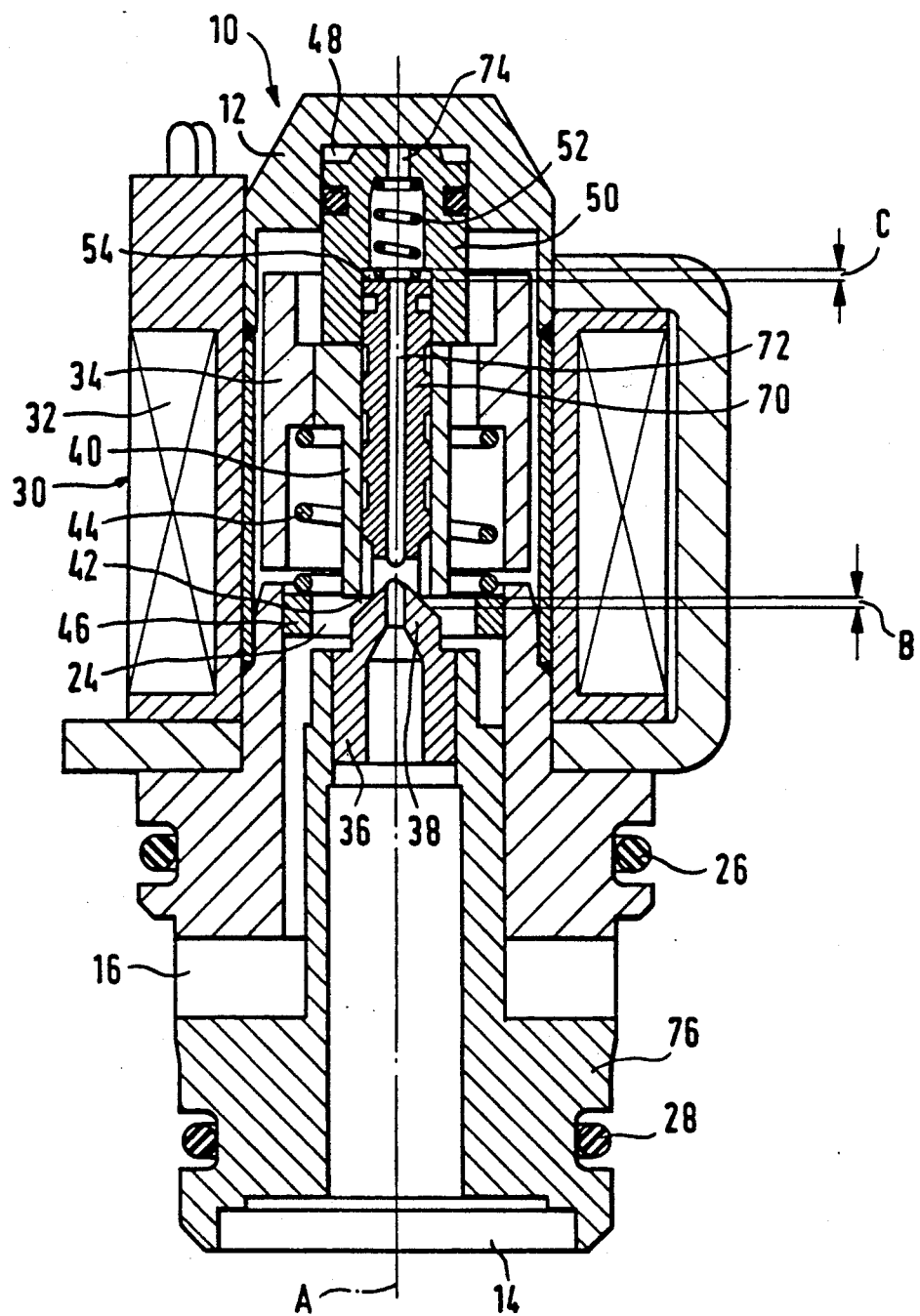
FIG. 3 is a view similar to FIG. 1 but showing a third embodiment of the invention.

All the valves 10 shown are open when currentless. That is taken care of by a return spring 44 which biases the armature 34 in opening direction, upwardly in all of the five figures. The return spring 44 either rests directly on the valve casing 12, as is the case with FIGS. 4 and 5, or on an apertured disc 46 which is fixed in the valve casing 12, as shown in FIGS. 1 to 3. According to FIGS. 1 and 2 the disc 46 at the same time acts as a guide for the valve portion 36 which is operable by the armature 34.

According to FIGS. 1 to 5, a cylindrical control chamber 48 in which the pressure is the same as at the inlet 14, regardless of the relative positions of the valve portions 36 and 40, is formed coaxially with the valve portions 36 and 40 in the valve casing 12. The control chamber 48 is defined toward the bottom, according to FIGS. 1 and 3 to 5, and toward the top, according to FIG. 2, by an adjustment member 50. As shown in FIGS. 1 to 4, the adjustment member 50 is a piston normally urged by a spring 52 into an inoperative position in which the control chamber 48 has its smallest volume possible. According to FIG. 5 the adjustment member 50 is a diaphragm which itself tends to adopt its inoperative position. In any case, the inoperative position of the adjustment member 50 is strictly defined by the design of the valve casing 12.

From its inoperative position, the adjustment member 50 can be urged into a stop position by fluid pressure if this fluid pressure is noticeably higher at the inlet 14 than at the outlet 16. In FIGS. 1 and 3 to 5 this will be in downward direction, while it is to the top in FIG. 2. In all the embodiments also this abutment or stop position is determined once and for all, namely by a shoulder 54 formed in the valve casing 12.

The adjustment member 50, when in its stop position, prevents the full opening of the valve 10. According to FIG. 1 that happens because, with the adjustment member 50 in its stop position, a piston rod 56 formed at the adjustment member 50 reduces the normal opening stroke B of the valve closing member 38 by the distance C by which the adjustment member 50 is movable between its inoperative position and its stop position. Consequently the valve can open in part only so that the fluid flow between the valve closing member 38 and the valve seat 42 is restricted to the extent desired.

Figure 4:
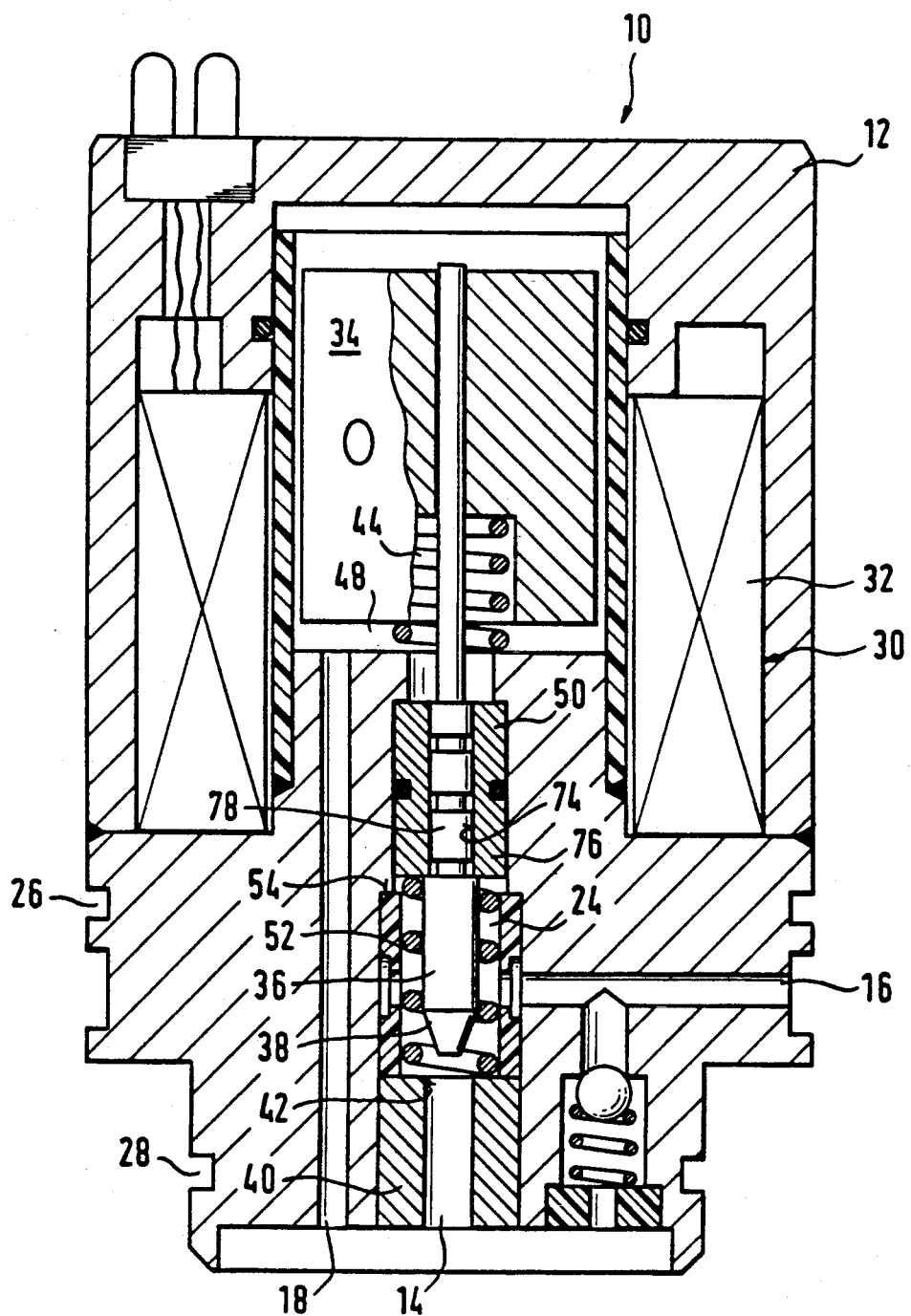
FIG. 4 is a view similar to FIG. 1 but showing a fourth embodiment of the invention.
Figure 5:
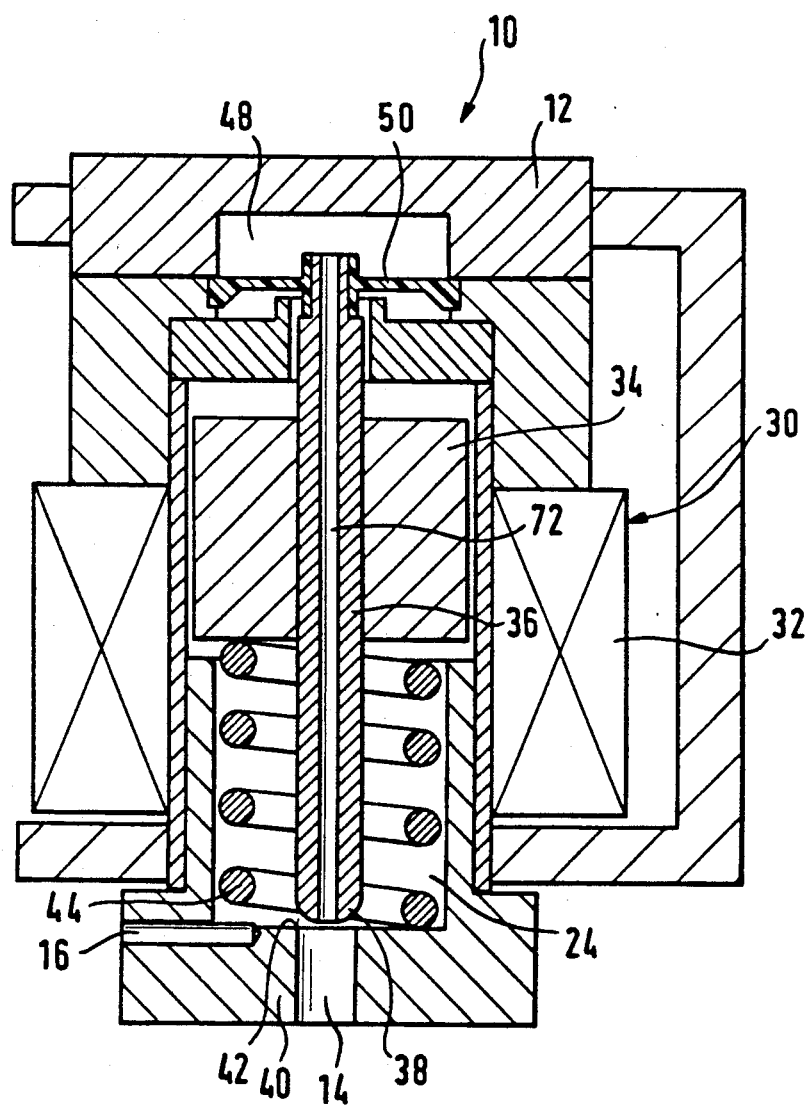
FIG. 5 is a view similar to FIG. 1 but showing a fifth embodiment of the invention.

According to FIGS. 3 to 5 the normal opening stroke B of the valve seat 42 is reduced accordingly by the distance C so that only a restricted flow of fluid is permitted when the adjustment member 50 is in its stop position.

Another way of preventing the full opening of the valve and thus effecting throttling of the flow may be gathered from the design illustrated in FIG. 2. There the adjustment member 50 is formed integral with the valve portion 40 which is independent of the electromagnet and which, in this example, carries the valve seat 42. When the adjustment member 50 is in its stop position, in this case being the upper limit position of the adjustment member 50, both the valve closing member 38 and the valve seat 42 together are displaced upwardly by the distance C with respect to the inoperative position of the adjustment member 50, with the valve in closed condition. This means that when the valve begins to open, part C of the total opening stroke B of the valve closing member 38 already has been used up so that the valve closing member 38 can be lifted off the valve seat 42 only by the distance B minus C as long as the adjustment member 50 remains in its stop position.

In addition to the valve 10, FIG. 1 shows some known details of an anti-lock system for motor vehicles, namely a conduit 58 which interconnects conduits 20 and 22 and contains a shutoff valve 60, a pressure reservoir 62 and a pump 64. Like valve 10 also the shutoff valve 60 is operable electromagnetically, but contrary to the first, it is normally closed.

During anti-lock control the shutoff valve 60 is opened in the usual manner either upon or immediately after the closing of valve 10 so that brake fluid from the brake connected to conduit 22 may be taken up preliminarily by the pressure reservoir 62 and then be conveyed back into the conduit 20 by the pump 64, thus being returned to the master cylinder. The same applies when anti-lock systems are furnished with the valves illustrated in FIGS. 2 to 5.

There is a peculiarity with the valve according to FIG. 2 in that the adjustment member 50 is embodied by a differential or stepped piston and guided and sealed in a corresponding stepped bore of the valve casing 12. The area between the piston seals is connected to atmosphere through a relief passage 66. According to FIG. 2 a nonreturn valve 68 is disposed in the valve casing 12 in parallel with the adjustment member 50 to permit pressure compensation by fluid flowing in return from the outlet 16 into a conduit (not shown) which communicates with the inlet 14.

As shown in FIG. 3, the valve closing member 38 which in this case is fixed in the casing has a rod-like cylindrical extension 70 on which the sleeve-like valve portion 40 with the annular valve seat 42 is guided under the control of the armature 34. The upper end of the extension 70 constitutes the shoulder 54 which determines the stop position of the adjustment member 50, thereby defining the distance C by which the adjustment member 50 is displaceable from its position of rest into its stop position in order to shorten the normal opening stroke B of the valve portion 40 by the distance C.

The extension 70 of the valve closing member 38 in FIG. 3 is formed with an axial through bore 72 which is followed by an axial through bore 74 formed in the adjustment member 50 and opening into the control chamber 48. Hereby the control chamber 48 communicates permanently, and at least approximately without any throttling, with the inlet 14. According to FIG. 3 the valve closing member 38 is fixed in the casing by the associated valve portion 36 being pressed firmly into a closure part 76 of the valve casing 12. The choice of the depth by which the valve portion 36 is pressed in determines the distance C by which the adjustment member 50 is movable.

According to FIG. 4 the additional connection 18 is located next to the inlet 14, in contrast to FIG. 1 where the additional connection 18 is at the other end of the valve casing 12, remote from the inlet 14. Another peculiar feature of the embodiment of FIG. 4 is the fact that the adjustment member 50 is arranged axially between the valve closing member 38 and the control chamber 48. As in FIG. 3, the adjustment member 50 has an axial through bore 74. According to FIG. 4 a piston-like central part 78 of the valve portion 36 is guided in this bore 74. The diameter of bore 74 is smaller than the effective diameter of the valve seat 42. Regardless of the effect of the spring 52, therefore, the valve 10 tends to open when the pressure applied at the inlet 14 is sufficient to overcome friction and any resistance against the displacement of the valve portion 36 and the armature 34 due to gravity, depending on the arrangement of the valve. The valve according to FIG. 4 thus will continue to function properly even if the spring 52 should be broken.

Apart from the feature already mentioned of the adjustment member 50 being a diaphragm, the valve shown in FIG. 5 further is distinct in that, contrary to FIG. 3, the axial through bore 72 extends through the valve portion 36 which is connected to the adjustment member 50 for joint axial movement.

What is claimed is:

1. In an electromagnetically operated valve for anti-lock systems in motor vehicles, comprising a valve casing having an inlet and an outlet, two valve portions one of which includes a valve closing member and the other of which a valve seat, an electromagnet and a return spring by means of the two of which one of the two valve portions is movable back and forth with respect to the other one a predetermined distance between a fully open position and a closed position; and adjustment member disposed in said valve casing, and being movable in response to a pressure difference between said inlet and said outlet between a first inoperative position and a second position in which said member operates on one of said portions of permit said portions to move to an open position while preventing said portions from moving said predetermined distance to said fully open position, the invention comprising an axial through-bore in said adjustment member, that valve portion which is movable by said electromagnet being in the shape of a piston and being axially guided in said through-bore.

2. In the valve as claimed in claim 1, characterized in that the adjustment member is arranged coaxially with the two valve portions.

3. In the valve as claimed in claim 1, characterized in that the adjustment member (50) is biased into inoperative position by a spring (52) which is supported in the valve casing (12).

4. In the valve as claimed in claim 1, characterized in that the adjustment member (50) is a piston.

5. In the valve as claimed in claim 1, wherein the valve seat has a greater diameter than said bore in the adjustment member.

* * * * *